(12) United States Patent
Patterson et al.

(10) Patent No.: US 8,081,590 B2
(45) Date of Patent: Dec. 20, 2011

(54) SYSTEMS AND METHODS FOR CONTROLLING SLEEP STATES OF NETWORK NODES

(75) Inventors: Wade C. Patterson, Huntsville, AL (US); Rick Martindale, Huntsville, AL (US)

(73) Assignee: Synapse Wireless, Inc., Huntsville, AL (US)

( * ) Notice: Subject to any disclaimer, the term of this patent is extended or adjusted under 35 U.S.C. 154(b) by 815 days.

(21) Appl. No.: 12/114,504

(22) Filed: May 2, 2008

(65) Prior Publication Data

US 2009/0022078 A1 Jan. 22, 2009

Related U.S. Application Data

(60) Provisional application No. 60/915,536, filed on May 2, 2007, provisional application No. 60/915,552, filed on May 2, 2007, provisional application No. 60/915,571, filed on May 2, 2007, provisional application No. 60/937,031, filed on Jun. 25, 2007, provisional application No. 60/953,630, filed on Aug. 2, 2007, provisional application No. 60/915,458, filed on May 2, 2007.

(51) Int. Cl.
*G08C 17/00* (2006.01)

(52) U.S. Cl. ... 370/311; 340/7.32; 340/7.36; 455/343.2; 455/343.4

(58) Field of Classification Search .......... 370/310, 370/311, 312; 455/561, 449, 422.1, 130, 455/334, 343.1, 343.2, 343.3, 343.4; 340/1.1, 340/6.1, 7.2, 7.32, 7.33, 7.34, 7.36
See application file for complete search history.

(56) References Cited

U.S. PATENT DOCUMENTS

| | | | |
|---|---|---|---|
| 7,299,068 B1 * | 11/2007 | Halla et al. | 455/561 |
| 7,328,243 B2 | 2/2008 | Yeager et al. | |
| 2005/0009578 A1 * | 1/2005 | Liu | 455/574 |
| 2005/0129097 A1 | 6/2005 | Strumpf et al. | |
| 2007/0188340 A1 * | 8/2007 | Kimura et al. | 340/691.6 |
| 2007/0250930 A1 | 10/2007 | Aziz et al. | |
| 2008/0229415 A1 | 9/2008 | Kapoor et al. | |

FOREIGN PATENT DOCUMENTS

WO   WO 03/090411 A1   10/2003

* cited by examiner

*Primary Examiner* — Chi Pham
*Assistant Examiner* — Weibin Huang
(74) *Attorney, Agent, or Firm* — Lanier Ford Shaver & Payne, P.C.; Jon E. Holland

(57) ABSTRACT

The present disclosure generally relates to systems and methods for controlling nodes in a communication network, such as a wireless sensor network. In one exemplary embodiment, a node, referred to herein as a "coordinator node," controls the operation of various nodes, referred to herein as "sensor nodes," that are configured to monitor various parameters. The coordinator node from time-to-time broadcasts a beacon to the sensor nodes. The beacon can include various information that is used by the sensor nodes for control. In one exemplary embodiment, the beacon includes node-specific information that informs at least some nodes that they are to transition to a sleep state for a certain period of time. Such nodes, based on the beacon, transition to a sleep state, thereby conserving electrical power.

8 Claims, 4 Drawing Sheets

SYSTEMS AND METHODS FOR CONTROLLING SLEEP STATES OF NETWORK NODES

CROSS REFERENCE TO RELATED APPLICATIONS

This application claims priority to U.S. Provisional Patent Application No. 60/915,536, entitled "Wireless Communication Modules," and filed on May 2, 2007, which is incorporated herein by reference. This application also claims priority to U.S. Provisional Patent Application No. 60/915,552, entitled "Nodes for Wireless Sensor Networks," and filed on May 2, 2007, which is incorporated herein by reference. This application claims priority to U.S. Provisional Patent Application No. 60/915,571, entitled "Sensor Networks," and filed on May 2, 2007, which is incorporated herein by reference. This application claims priority to U.S. Provisional Patent Application No. 60/937,031, entitled "Sensor Networks," and filed on Jun. 25, 2007, which is incorporated herein by reference. This application claims priority to U.S. Provisional Patent Application No. 60/953,630, entitled "Sensor Networks," and filed on Aug. 2, 2007, which is incorporated herein by reference. This application claims priority to U.S. Provisional Application No. 60/915,458, entitled "Protocols for Wireless Communication," and filed on May 2, 2007, which is incorporated herein by reference.

RELATED ART

Wireless sensor networks are used in a variety of applications. For example, nodes of a wireless sensor network may be positioned at various locations of a manufacturing plant to sense, report, and/or control various conditions around the plant, such as conditions relating to machinery operation. Various nodes, referred to as a "sensor nodes," have at least one sensor for detecting an event, such as an operational state of equipment, and information about the sensed events is typically communicated throughout the network. Logic within the network analyzes the sensor data and controls various equipment and/or nodes based on the data. For example, a sensor may detect an overheating condition for equipment being monitored, and the logic may provide a signal for shutting down operation of the equipment in response to the overheating condition. Wireless sensor networks may be used in a variety of other applications and for performing various other functions.

Unfortunately, engineering a wireless sensor network (WSN) can be difficult, expensive, and burdensome. For example, unreliability of data communication can be a problem, particularly in noisy environments, such as manufacturing facilities. Further, data collisions may result from wireless signals communicated by nearby foreign networks. Moreover, at any time, a node may appear or leave a network due to communication issues or otherwise. In addition, the monitoring and/or control to be provided by a WSN can be complex.

Power consumption is yet another challenge facing designers of a WSN. In this regard, sensor nodes are often positioned in locations that do not have access to a continuous power source. Thus, sensor nodes often utilize batteries, which require replacement and/or recharging from time-to-time, thereby making power consumption an important design consideration.

Moreover, techniques for reducing the costs and burdens of developing, implementing, and operating a WSN are generally desirable.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally relates to systems and methods for controlling nodes in a communication network, such as a wireless sensor network. In one exemplary embodiment, a node, referred to herein as a "coordinator node," controls the operation of various nodes, referred to herein as "sensor nodes," that are configured to monitor various parameters. The coordinator node from time-to-time broadcasts a beacon to the sensor nodes. The beacon can include various information that is used by the sensor nodes for control. In one exemplary embodiment, the beacon includes node-specific information that informs at least some nodes that they are to transition to a sleep state for a certain period of time. Such nodes, based on the beacon, transition to a sleep state, thereby conserving electrical power.

Figure 1:
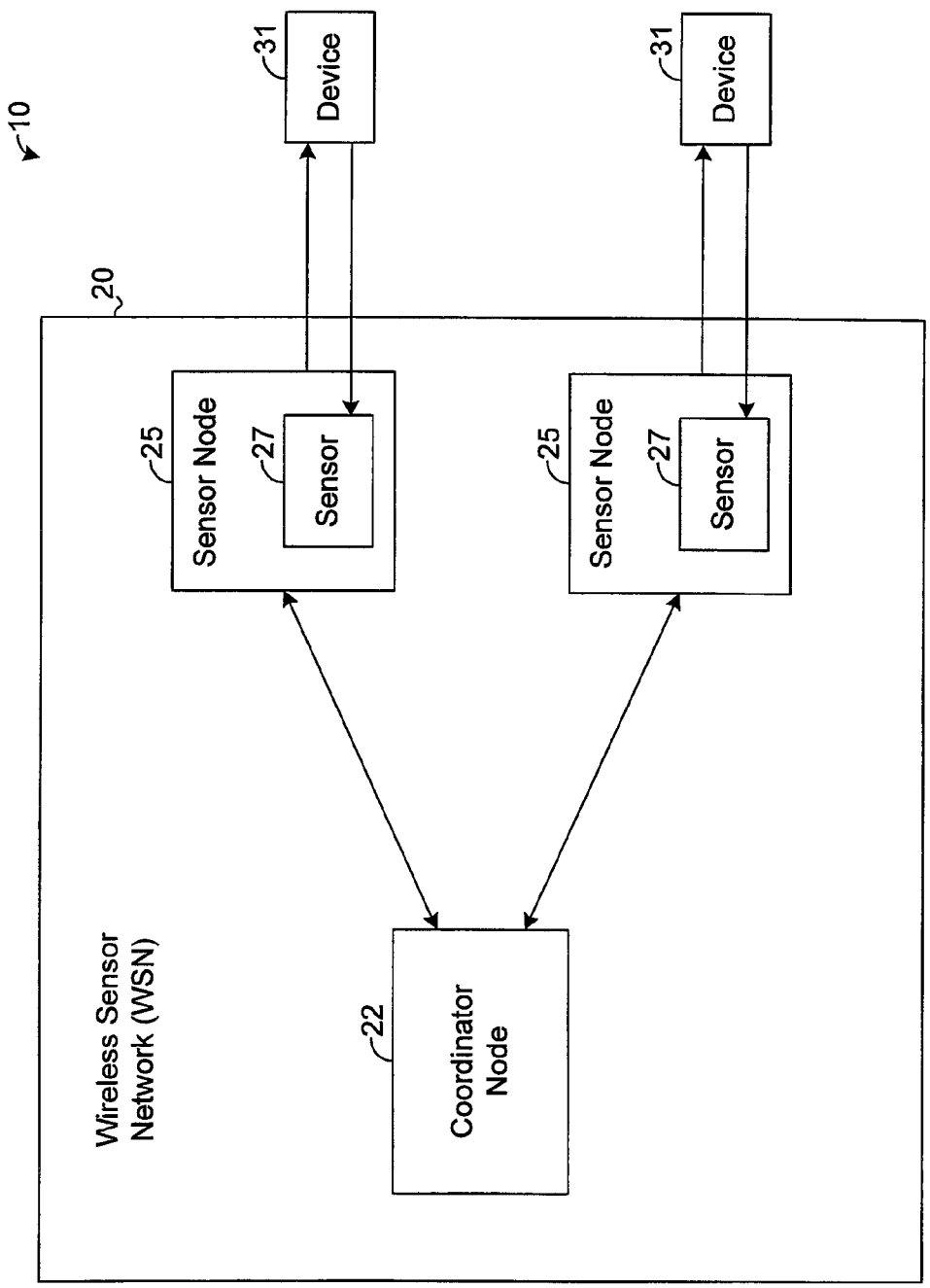
FIG. 1 is a block diagram illustrating an exemplary embodiment of a system that utilizes a wireless sensor network (WSN).

FIG. 1 depicts an exemplary embodiment of a system 10 that employs an exemplary wireless sensor network (WSN) 20. The WSN 20 comprises at least one coordinator node 22 and a plurality of sensor nodes 25. Each sensor node 25 has a sensor 27 for sensing an operational parameter of an application-specific device 31. The device 31 can be configured to perform any desirable task for the application in which the system 10 is implemented.

As an example, the system 10 may be implemented at a manufacturing plant, and the device 31 may be manufacturing equipment, such as a motor. In such case, the sensor 27 coupled to the device 31 may be configured to sense an operating parameter such as a temperature or motor speed of the device 31. In another application, the system 10 may be a watering system, and the device 31 may be a sprinkler head of the system 10. In such an embodiment, the sensor 27 may be configured to sense whether the sprinkler head is currently dispensing water. There are many other types of applications and devices that may be used in other embodiments.

In one exemplary embodiment, the sensor nodes 22 communicate with the coordinator node 22 via wireless signals, such as radio frequency (RF) signals or signals of other frequencies. Further, it is possible for any of the sensor nodes 25 to communicate with any of the other sensor nodes 25. Moreover, the network 20 may be implemented as a mesh, a star, or other type of known communication network. Exemplary techniques for communicating in the network 20 are described in the provisional patent applications set forth above.

Note that the sensor node 25 may be configured to control the device 31 to which it is coupled in some desired manner. For example, if the device 31 is a motor, the node 25 may be configured to activate and/or deactivate the motor depending on various factors. The sensor node 25 may include logic for controlling the device 31 in a desired manner. In addition, logic for controlling the device may reside at another node, such as another sensor node 25 or at the coordinator node 22, and messages may be communicated between the nodes to instruct one or more nodes 25 to control one or more devices 31 in a desired manner. Note that the coordinator node 22, like the sensor nodes 25 shown by FIG. 1, may have a sensor for sensing a device parameter and/or may directly control a device 31, if desired.

Figure 2:
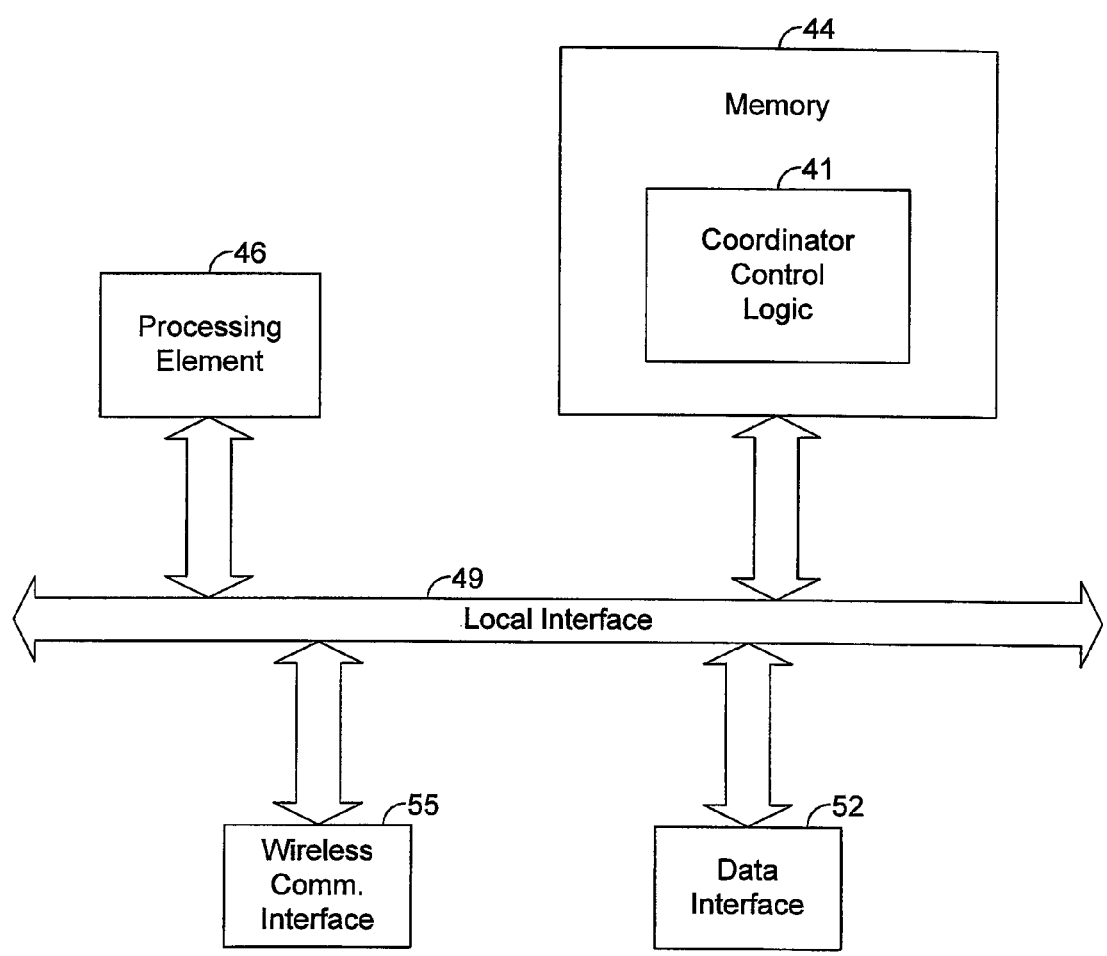
FIG. 2 is a block diagram illustrating an exemplary embodiment of a coordinator node, such as is depicted in FIG. 1.

FIG. 2 depicts an exemplary embodiment of a coordinator node 22. The coordinator node 22 comprises coordinator control logic 41 for generally controlling the operation of the node 22. The control logic 41 can be implemented in software, firmware, hardware, or any combination thereof. In the exemplary embodiment illustrated in FIG. 2, the control logic 41 is implemented in software and stored in memory 44.

The exemplary embodiment of the coordinator node 22 depicted by FIG. 2 comprises at least one conventional processing element 46, such as a digital signal processor (DSP) or a central processing unit (CPU), that communicates to and drives the other elements within the node 22 via a local interface 49, which can include at least one bus. Furthermore, the node 22 comprises a data interface 52, such as a RS232 port, for communicating data with an external device. The node 22 also has a wireless communication module 55 for communicating wirelessly with the sensor nodes 25. In other embodiments, the coordinator node 22 can be coupled to any of the sensor nodes 25 via physical media so that wireless communication is unnecessary.

Figure 3:
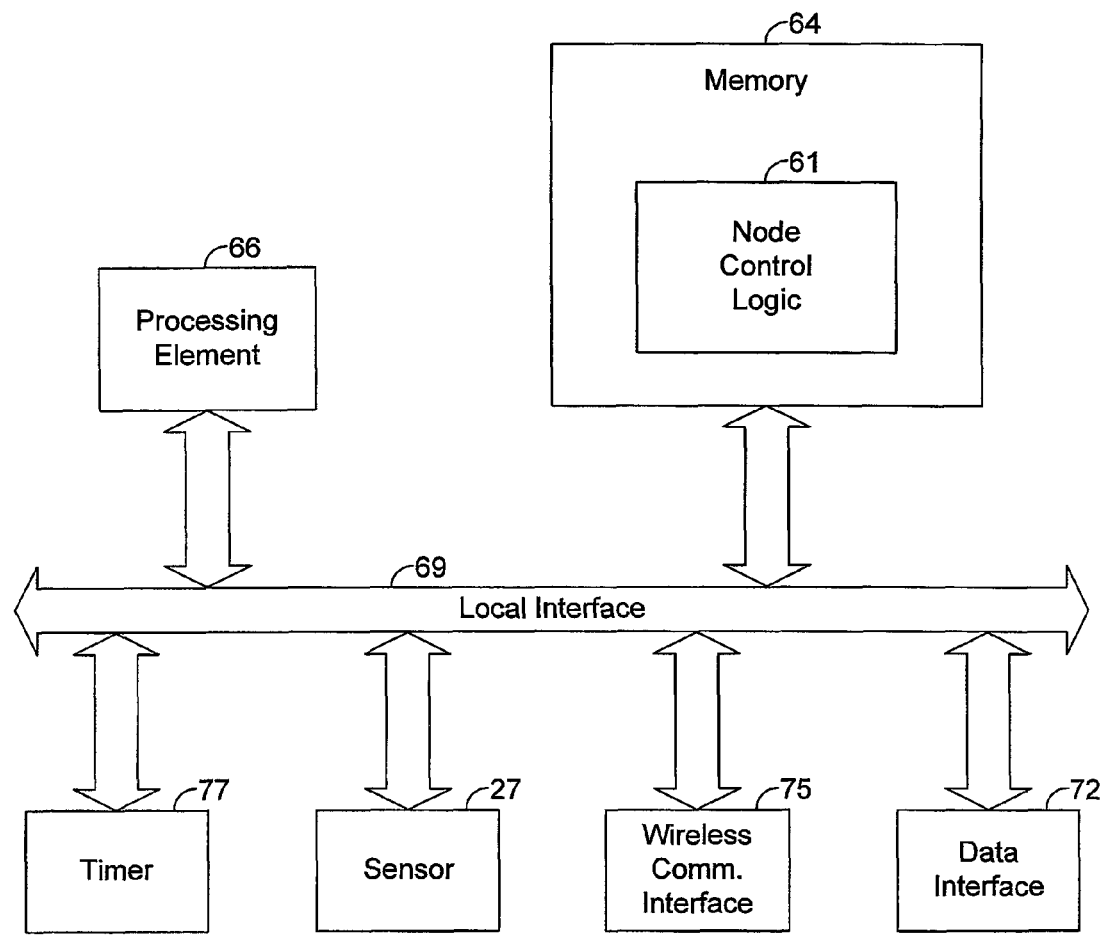
FIG. 3 is a block diagram illustrating an exemplary embodiment of a sensor node, such as is depicted in FIG. 1.

FIG. 3 depicts an exemplary embodiment of a sensor node 25. The sensor node 25 comprises node control logic 61 for generally controlling the operation of the node 25. The control logic 61 can be implemented in software, firmware, hardware, or any combination thereof. In the exemplary embodiment illustrated in FIG. 3, the control logic 61 is implemented in software and stored in memory 64.

The exemplary embodiment of the sensor node 25 depicted by FIG. 3 comprises at least one conventional processing element 66, such as a digital signal processor (DSP) or a central processing unit (CPU), that communicates to and drives the other elements within the node 25 via a local interface 69, which can include at least one bus. Furthermore, the node 25 comprises a data interface 72, such as a RS232 port, for communicating data with an external device. The node 25 also has a wireless communication module 75 for communicating wirelessly with the coordinator node 22 and/or other sensor nodes 25. An exemplary wireless communication module 55, 75 is described in U.S. Provisional Patent Application No. 60/915,536, which is incorporated herein by reference. The node 25 also has a timer 77, which will be described in more detail hereinbelow.

The coordinator node 22 coordinates various aspects of the network 20, such as communication among the nodes, the functions of the sensor nodes 25, or a specific task or tasks to be performed by the network 20. For example, the coordinator node 22 may be responsible for coordinating an event, such as activation or deactivation of various devices 31, in response to a particular stimulus or otherwise. Note that it is unnecessary for the coordinator node 22 to coordinate communication among the sensor nodes 25. For example, the network 20 may be implemented as a mesh network, and the coordinator node 22 may be a participant on the network 20 like the other sensor nodes 25. However, even in a mesh network, the node 22 may be responsible for coordinating a specific event or events, and it may be desirable for the node 22 to broadcast beacons, as described herein.

In at least one exemplary embodiment, the coordinator node 22 from time-to-time broadcasts a beacon generally for confirming the presence of the network. In one embodiment, the beacon is transmitted periodically at a predefined time interval. In other embodiments, the beacon can be transmitted according to a different algorithm. For example, the coordinator node 22 may include in each beacon a time value indicating the time or times that a future beacon or beacons are to be transmitted. In such way, the coordinator node 22 has the flexibility of changing the timing of beacon occurrence and informing the sensor nodes 25 of the beacon time changes.

In at least one embodiment, the sensor nodes 25 join the network 20 in response to beacons. In this regard, each beacon includes the network identifier of the coordinator node 22. When a sensor node 25 that has yet to join the network 20 receives a beacon, the sensor node 25 responds to the beacon by using the network identifier of the coordinator node 22 to transmit a reply message to the coordinator node 22. The reply message preferably includes an identifier of the sensor node 25. Thus, the coordinator node 22 learns of the presence of the sensor node 25 and, thereafter, may communicate with the sensor node 25. Through such communication, the coordinator node 22 may receive data (e.g., sensor data) from the sensor node 25 and may control the actions of the sensor node 25. For example, to instruct sensor nodes 25 to perform various actions, the coordinator node 22 may transmit commands to various sensor nodes 25 that have previously joined the network 25. In such an example, the coordinator node 22 essentially coordinates actions taken by the sensor nodes 25 and the communication that occurs with the sensor nodes 25.

In one exemplary embodiment, messages communicated through the network 22 and having payload or sensitive data are encrypted to protect the such data from authorized access. However, the beacons broadcast by the coordinator node 22 do not include payload data or other sensitive data for which encryption is desired, and the coordinator node 22 refrains from encrypting the beacon. Thus, it is unnecessary for any of the sensor nodes 25 to decrypt the beacons. In other embodiments, it is possible for the beacon to include payload or sensitive data and for the beacon to be encrypted.

In addition, in one exemplary embodiment, a beacon includes control data identifying each node 25 that is to receive a message from the coordinator node 22 or other node 25 before the transmission of the next beacon or other specified time period. In this regard, before transmitting a beacon, the coordinator node 22 determines which nodes are to receive a message prior to the transmission of the next beacon based on the expected tasks that are to occur before the transmission of the next beacon. The coordinator node 22 includes in the current beacon an identifier of the nodes 25 that are to receive messages prior to the transmission of the next beacon. Thus, if a sensor node 25 is not identified by the beacon, then the sensor node 25 transitions to a sleep state until just before the transmission of the next beacon thereby conserving electrical power.

Note that the sensor node 25 may be aware of the timing of the next beacon in a variety of ways. For example, the transmission of beacons may be periodic. Alternatively, the beacon may include information indicative of the time of the next or a future beacon transmission. Other techniques are possible in other embodiments.

For a sensor node 25 that is to receive a message before the next beacon, the coordinator node 22 includes, in the current beacon, a time parameter indicating when the sensor node 25 can expect to receive a message or messages. Such time parameter is associated with the node's identifier so that the identified node 25 can find the time relevant time parameter. Moreover, the sensor node 25 may go to sleep (if there is sufficient time prior to an expected message) until just before the time when it is to receive the expected message, and the sensor node 25 schedules an awakening just prior to such time. After receiving the message (and performing any action, if any, commanded by the message), the sensor node 25 may go back to sleep until just before the next beacon or the next scheduled message. Moreover, for each beacon, each of the sensor nodes 25 is awake so that it can receive the beacon and determine whether to expect a message before the next beacon.

In some embodiments, the beacon can indicate which nodes 25 are not to receive a message before the next beacon rather than or in addition to indicating which beacons are to receive a message. In this regard, before transmitting a beacon, the coordinator node 22 determines whether any of the nodes 25 can go to sleep for a time period. For example, based on the events to be coordinated, the coordinator node 25 may determine that communication with a particular node 25 will not occur or at least is unlikely to occur for at least a certain time period. For example, the coordinator node 22 may be implementing a task for which a particular node 25 is not to be contacted until various other tasks have been performed. In such case, the coordinator node 22 may determine that such node 25 can go to sleep for a time period equal to the expected time to perform the other tasks. The coordinator node 22 includes the identifier of such node 25 in a beacon being broadcast to inform the node 25 that it may go to sleep. The beacon may also have a parameter, which is associated with the identifier in the beacon, indicating the amount of time that the node 25 can go to sleep. Upon receiving the beacon, the sensor node 25 reads its identifier and, based on the identifier, goes to sleep. The node 25 may go to sleep for a predefined time period or for a time period indicated by the beacon, if the beacon includes such information.

Moreover, since the coordinator node 22 controls the sleep states of the nodes 25, the coordinator node 22 is aware of which nodes 25 are in a sleep state. If the coordinator node 22 determines that a message is to be sent to a sleeping node 25, the coordinator node 22 preferably waits until the node 25 is to awake before transmitting the message or authorizing the transmission of the message to the node 25.

Note that a node's sleep state may include many of the node's components. For example, the node 25 may put all components to sleep except for a component, such as a circuit, that tracks time and awakens the other components when the node 25 is to transition out of the sleep state. Alternatively, only a few of the components may be put to sleep while the control logic 61 continues to perform various actions, such as monitoring and/or controlling a device 31. For example, the control logic 61 may transition the wireless communication module 75 to a sleep state such that the node 25 does not usurp power to monitor traffic on the network 20 during the sleep state.

Note that, by not encrypting the beacon, the amount of time that each sensor node 25 may remain asleep is increased, since the sensor nodes 25 do not need to spend time decrypting the beacon. Accordingly, a sensor node 25 that awakens to receive a beacon may quickly go back to sleep if such beacon does not indicate that the sensor node is to receive a message prior to the next beacon.

In addition, in at least one exemplary embodiment, the coordinator node 22 enables beacon skipping, which refers to a process for causing a sensor node 25 to remain asleep for the duration of a time period in which one or more beacons are broadcast. Thus, at least one beacon broadcast during such time period is not received or processed by the sensor node 25 and, in this sense, is "skipped." For example, in a current beacon, the coordinator node 22 may include data indicating that a particular sensor node 25 is to skip x number of beacons, where x is any integer greater than zero. In such an example, the sensor node 22 schedules an awakening to occur just before the (x+1) beacon and then goes to sleep such that the node 25 remains asleep for the next x beacons and, therefore, misses the next x beacons. In an embodiment in which the beacon broadcasts are periodic, the sensor node 25 can calculate the precise time period for scheduling the awakening. In another embodiment, rather than indicating the number of beacons to be skipped, the current beacon may indicate the time that the sensor node 25 is to schedule an awakening. Other techniques for conveying sufficient information to cause a sensor node 25 to skip one or more beacons are possible.

Beacon skipping may be used when it is expected that the coordinator node 22 will not attempt to transmit a message to a sensor node 25 until a time after the broadcast of the next x beacons. In addition, by enabling a sensor node 25 to skip at least some beacons, the sensor node 25 can remain asleep for a longer period of time thereby conserving electrical power. Note that the number of beacons to be skipped by any of the nodes 25 may vary, and it is unnecessary for the same number of beacons to be skipped by each node and/or for each beacon skipping operation. In this regard, as described above, the information in the beacon may be node-specific such that the sleep states of multiple nodes 25 are controlled in different manners by the same beacon.

In addition, beacon skipping may be employed with any of the aforementioned techniques of putting sensor nodes 25 to sleep. For example, the coordinator node 22 may be configured to include the identifiers of sensor nodes 25 to receive messages before the next beacon, as described above. In such an embodiment, the sensor nodes 25 identified by such identifiers transition to a sleep state. In addition, the beacon may also include the identifiers of nodes 25 that are to skip beacons. Such identifiers are associated with a beacon count indicating the number of beacons to be skipped.

In at least one exemplary embodiment, the coordinator node 22 includes a value, referred to herein as a "node locator value," in each beacon. Each sensor node 25 is configured to determine whether it has previously received the same node locator value in an earlier beacon. If not, the sensor node 25 transmits a reply to the coordinator node 22 indicating the sensor node's presence on the network 20. In this regard, the reply includes an identifier that uniquely identifies the sensor node 25 from other sensor nodes 25 on the network 20.

Accordingly, the coordinator node 22 may discover the current topology of the network 20 by updating the node locator value in the next beacon broadcast by the coordinator node 22. Since each sensor node 25 has not previously received the newly updated node locator value, each sensor node 25 that receives the beacon should reply. Thus, the coordinator node 22 can determine which sensor nodes 25 still have a presence on the network and, in particular, can identify if any sensor nodes 25, which previously joined the network, are no longer able to receive messages from the coordinator node 22 and/or have left the network 20.

To better illustrate the foregoing embodiment, assume that the coordinator node 22, upon power-up, broadcasts an initial beacon that includes a first node locator value (e.g., 0). Since this is the first beacon broadcast by the coordinator node 22, each sensor node 25 of the network 20 that receives the first beacon replies. Accordingly, the coordinator node 22 is aware of the topology of the network 20.

Each sensor node 25 that replies to the first beacon stores the first locator value in memory 64 for comparing such value to node locator values in future beacons. Assume that, in the next beacon (i.e., the second beacon), the coordinator node 22 again includes the first node locator value (e.g., 0). Since the second beacon includes the same node locator value as the first beacon, the sensor nodes 25 that received the first beacon do not reply to the second beacon. In this regard, each such sensor node 25 compares the node locator value in the second beacon to the node locator value stored in memory 64, and these two values should match. In such case, the sensor node 25 refrains from transmitting a reply message in response to the second beacon.

However, any of the sensor nodes 25 that did not receive the first beacon but did receive the second beacon will transmit a reply to the second beacon. Accordingly, the coordinator node 22 may discover the presence of a new sensor node 25 that has joined the network since the transmission of the first beacon.

At some point, the coordinator node 22 may update the node locator value to be transmitted in the next beacon. For example, rather than including the first node locator value, the coordinator node 22 may include a second node locator value (e.g., 1) in a beacon about to be transmitted. Since none of the sensor nodes 25 has previously received the second node locator value, which is new, each sensor node 25 that receives the new beacon should reply. In this regard, each sensor node 25 receiving the new beacon compares the second node locator value in the new beacon to the first node locator value stored in memory 64. Since the values do not match, the sensor node 25 transmits a reply in response to the new beacon. Accordingly, the coordinator node 22 may identify nodes 25 that have left the network 20 prior to the transmission of the new beacon. In this regard, if a particular sensor node 25 replied to a previous beacon but did not reply to the new beacon, then the coordinator node 22 is aware that the sensor node 25 has left the network and/or is unable to communicate with the coordinator node 22. The coordinator node 22 preferably stores topology data listing each node 25 presently on the network 20, and the coordinator node 22 from time-to-time updates such data as it discovers the presence of new nodes 25 and the departures of old nodes 25.

Further, if a particular sensor node 25, due to communication problems or otherwise, is unable to temporarily communicate with the coordinator node 22, the coordinator node 22 could discover this event. In this regard, such a sensor node 25 may reply to a beacon including the first node locator value such that the coordinator node 22 discovers the presence of the sensor node 25. However, thereafter, the sensor node 25 may be unable to communicate with the coordinator node 22 when the coordinator node 22 transmits a new beacon with a new node locator value. Since the sensor node 25 is unable to receive the new beacon, the sensor node 25 does not reply. If communication with the sensor node 25 is later established, then the sensor node 25 should reply to the next beacon assuming that such beacon includes a node locator value that has not been previously received by the sensor node 25. Accordingly, the coordinator node 22 is alerted to the fact that the sensor node 25 was temporarily out of communication with the coordinator node 22 but is now communicating with the coordinator node 22 again. In other embodiments, other techniques may be used discover and/or confirm the topology of the network 20.

In addition to communicating directly with the sensor nodes 25, the coordinator node 22 may instruct any one of the sensor nodes 25 to communicate directly with any of the other sensor nodes 25. Further, unlike the beacon, which is unencrypted, any payload data transmitted by either the coordinator node 22 or a sensor node 25 may be encrypted in an effort to protect such data from unauthorized access.

In several embodiments described above, the network 20 is described as being a wireless sensor network. However, in other embodiments, other types of communication networks may employ the techniques described herein.

An exemplary use and operation of the network 20 will be described hereinbelow with reference to FIG. 4.

For the purposes of illustration, assume that the coordinator node 22 broadcasts a beacon periodically (e.g., every five minutes). Before transmitting a beacon, the coordinator node 22 determines whether any of the nodes 25 can be put to sleep. As a mere example, assume that the coordinator node 22 determines that a particular node 25, referred to hereafter as the "target node," will not likely need to receive a message over the network 20, from the coordinator node 22 or other node 25 for about 15 minutes. In such case, the coordinator node 22 includes an identifier of the target node 25 in the beacon, referred to hereafter as the "current beacon," and associates the identifier with a value of two to indicate that the target node 25 is to skip the next two beacons and, therefore, be awake to receive the third beacon.

Figure 4:
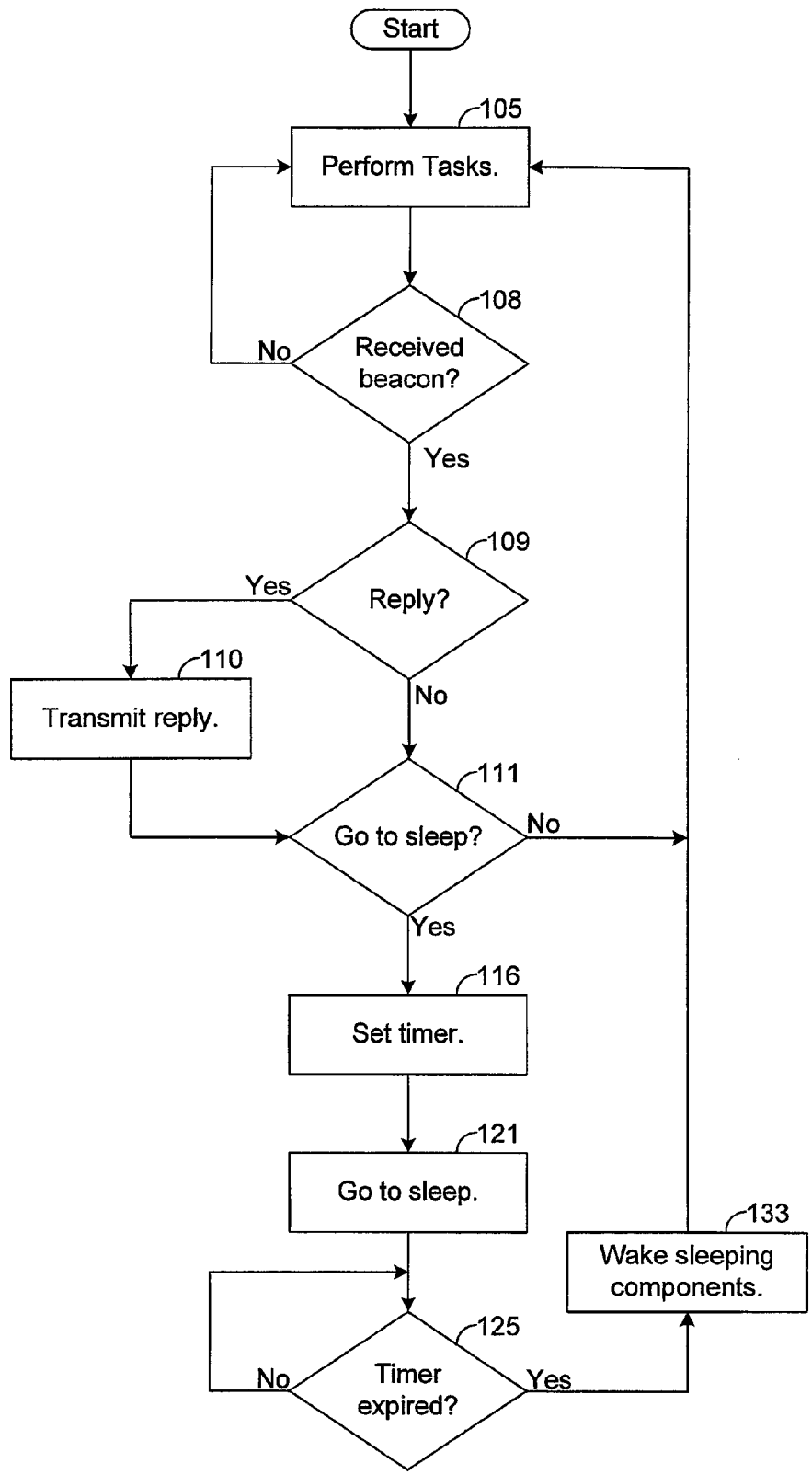
FIG. 4 is a flow chart illustrating an exemplary method of controlling a sensor node, such as is depicted in FIG. 3.

As shown by block 105 of FIG. 4, the control logic 61 of the target node 25 is configured to perform various tasks, such as monitoring and/or controlling the device 31 coupled to the node 25. For example, the sensor 27 of the target node 25 may take readings of an operational parameter for the device 31. The logic 61 may control the operation of the device 31 based on the readings or may communicate data indicative of the readings to other nodes of the network 20.

When the target node 25 receives the current beacon, the node's control logic 61 makes a "yes" determination in block 108 and then determines, in block 109, whether to transmit a reply message. As described above, such determination may be based on a node locator value included in the current beacon. If a reply is to be transmitted, the control logic 61 of the target node 25 does so in block 110.

In addition, the control logic 61 determines, based on the current beacon, whether to transition to sleep state in block 111. In this regard, the logic 61 determines to transition to a sleep state if the node's identifier is included in the beacon. In the instant example, the node's identifier is included in the current beacon, and the control logic 61, therefore, makes a "yes" determination in block 111.

Thus, the control logic 61 sets a timer 77 (FIG. 3) to expire in block 116. The time period for expiration is based on the beacon number associated with the node's identifier in the current beacon. In the instant example, the beacon number is two indicating that the next two beacons are to be skipped. Since the third beacon is to be received in fifteen minutes, the control logic 61 sets the timer 77 to expire just under fifteen minutes so that the target node 25 will be awake to receive the third beacon.

After setting the timer 77, the control logic 61 transitions to a sleep state, as shown by block 121. In one exemplary embodiment, all of the components of the node 25 transition to a sleep state except for the timer 77. In other embodiments, the logic 61 transitions select components, such as the wireless communication module 75, to a sleep state while other components remain active.

In one embodiment, the timer 77 is a circuit configured to run while the other components of the node 25 are sleeping. In this regard, the timer 125, in block 125, monitors the amount of time since the occurrence of block 116. Once the timer 77 expires, the timer 77 awakens the sleeping components in block 133.

Accordingly, based on the expected network communication, the coordinator node 22 causes at least some sensor nodes 25 to transition to a sleep state for certain time periods thereby conserving the electrical power consumed by the sensor nodes 25.

Now, therefore, the following is claimed:

1. A wireless sensor network, comprising:
a coordinator node configured to broadcast a beacon; and
a plurality of sensor nodes including at least a first sensor node and a second sensor node, each of the sensor nodes having a sensor for reading a parameter and configured to transmit data based on the sensor over the network, the first sensor node configured to reply to the beacon, wherein a component of the second sensor node is configured to transition to a sleep state based on whether an identifier of the second sensor node is in the beacon, wherein the coordinator node is configured make a determination whether the second sensor node is to receive a message during an expected activity relating to the sensor nodes, and wherein the coordinator node is configured to insert the identifier of the second sensor node into the beacon based on the determination.

2. A wireless sensor network, comprising:
a coordinator node configured to broadcast a beacon; and
a plurality of sensor nodes including at least a first sensor node and a second sensor node, each of the sensor nodes having a sensor for reading a parameter and configured to transmit data based on the sensor over the network, the first sensor node configured to reply to the beacon, wherein a component of the second sensor node is configured to transition to a sleep state based on whether an identifier of the second sensor node is in the beacon, wherein the beacon includes the identifier and a parameter associated with the identifier, the parameter indicative of a time period, and wherein the second sensor node is configured to control a duration of the sleep state based on the parameter.

3. A wireless sensor network, comprising:
a coordinator node configured to broadcast a beacon; and
a plurality of sensor nodes including at least a first sensor node and a second sensor node, each of the sensor nodes having a sensor for reading a parameter and configured to transmit data based on the sensor over the network the first sensor node configured to reply to the beacon, wherein a component of the second sensor node is configured to transition to a sleep state based on whether an identifier of the second sensor node is in the beacon, wherein the beacon includes the identifier and a beacon count associated with the identifier, and wherein the second sensor node is configured to control a duration of the sleep state based on the beacon count.

4. A wireless sensor network, comprising: a coordinator node configured to broadcast a beacon; and a plurality of sensor nodes including at least a first sensor node and a second sensor node, each of the sensor nodes having a sensor for reading a parameter and configured to transmit data based on the sensor over the network, the first sensor node configured to reply to the beacon, wherein a component of the second sensor node is configured to transition to a sleep state based on whether an identifier of the second sensor node is in the beacon, wherein the beacon has a node locator value, wherein the first sensor node is configured to reply to the beacon based on the node locator value, wherein the first sensor node is configured to perform a comparison between the node locator value and a node locator value in another beacon received by the first sensor node, and wherein the first sensor node further configured to transmit a beacon reply to the coordinator node based on the comparison.

5. A method for use in a wireless sensor network, comprising the steps of:
broadcasting a beacon;
receiving the beacon at a plurality of sensor nodes including at least a first sensor node and a second sensor node, each of the sensor nodes having a sensor;
determining whether the beacon has an identifier of the second sensor node;
replying, via the first sensor node, to the beacon;
transitioning a component of the second sensor node to a sleep state based on the determining step;
determining whether the second sensor node is to receive a message during an expected activity relating to the sensor nodes; and
inserting the identifier of the second sensor node into the beacon based on the determining whether the second sensor node is to receive the message step.

6. A method for use in a wireless sensor network, comprising the steps of:
broadcasting a beacon;
receiving the beacon at a plurality of sensor nodes including at least a first sensor node and a second sensor node, each of the sensor nodes having a sensor;
determining whether the beacon has an identifier of the second sensor node;
replying, via the first sensor node, to the beacon;
transitioning a component of the second sensor node to a sleep state based on the determining step;
inserting the identifier into the beacon;
associating a parameter with the inserted identifier, the parameter indicative of a time period; and
controlling a duration of the sleep state based on the parameter.

7. A method for use in a wireless sensor network, comprising the steps of:
broadcasting a beacon, the beacon having a locator value;
receiving the beacon at a plurality of sensor nodes including at least a first sensor node and a second sensor node, each of the sensor nodes having a sensor;
determining whether the beacon has an identifier of the second sensor node;
transitioning a component of the second sensor node to a sleep state based on the determining step;
comparing the node locator value to a node locator value in another beacon received by the first sensor node; and
replying to the beacon via the first sensor node based on the comparing step.

8. A method for use in a wireless sensor network, comprising the steps of: broadcasting a beacon including identifiers of sensor nodes that are to receive messages within a specified time period; and transitioning a component of a first sensor node to a sleep state in response to a determination that an identifier of the first sensor node is not included in the beacon, transitioning a component of a second sensor node to a sleep state in response to a determination that an identifier of the second sensor node is included in the beacon, wherein the identifier of the second sensor node is included in the beacon and associated with a beacon count included in the beacon; and controlling a duration of the sleep state for the component of the second sensor node based on the beacon count.

* * * * *